United States Patent [19]

Chang

[11] 4,097,421

[45] Jun. 27, 1978

[54] FOAMABLE STRUCTURAL THERMOPLASTIC POLYESTER RESINS

[75] Inventor: Tai Ming Chang, Tallmadge, Ohio

[73] Assignee: The Goodyear Tire & Rubber Company, Akron, Ohio

[21] Appl. No.: 458,747

[22] Filed: Apr. 8, 1974

[51] Int. Cl.² ............................................. C08J 9/00
[52] U.S. Cl. ........................... 260/2.5 N; 260/22 CQ; 260/22 T; 260/40 R; 260/857 PE
[58] Field of Search ........................ 260/2.5 N, 2.5 E

[56] References Cited

U.S. PATENT DOCUMENTS

| | | | |
|---|---|---|---|
| 3,227,664 | 1/1966 | Blades et al. | 260/2.5 E |
| 3,227,665 | 1/1966 | Fourcade et al. | 260/2.5 N |
| 3,375,211 | 3/1968 | Parrish | 260/2.5 E |
| 3,442,829 | 5/1969 | Moore et al. | 260/2.5 HB |
| 3,542,715 | 11/1970 | White et al. | 260/2.5 E |

*Primary Examiner*—Richard B. Turer
*Attorney, Agent, or Firm*—J. M. Wallace, Jr.

[57] ABSTRACT

This invention relates to foamable, thermoplastic polyester molding compositions, to molded products suitable for structural applications and to a process for their manufacture. The resin compositions when foamed have a cellular interior and a skin having structural strength.

15 Claims, No Drawings

FOAMABLE STRUCTURAL THERMOPLASTIC POLYESTER RESINS

This invention relates to foamable, thermoplastic polyester molding compositions. More particularly this invention relates to using hydrocarbyltetrazoles, lubricating agents, and reinforcing materials in the preparation of foamable, thermoplastic polyester molding compositions.

Most applications for foamed structural thermoplastic parts require the thermoplastic moldable composition to remain in an unfoamed state until final processing is performed. Heretofore it has not been possible to prepare foamable, thermoplastic polyester moldable compositions with a built-in chemical foaming agent in an unfoamed state because of the processing temperatures involved. The high temperatures necessary to process polyester compositions containing a foaming agent caused excessive decomposition of the foaming agent and produced a cellular material.

It has now been discovered that the addition of lubricants such as esters of an organic acid having from 10 to 27 carbon atoms or alkali or alkaline earth metal salts of an organic acid having from 10 to 25 carbon atoms (hereinafter metallic acid salt) to the thermoplastic polyester resin allows processing to take place at a temperature below the temperature at which significant decomposition of the foaming agent occurs. Of these, the metallic acid salts are preferred. Addition of a reinforcing material to the foamable polyester composition makes a smoother skin on the finished structural part and allows a cellular structure on the interior of the structural part when foamed.

According to the invention, metallic acid salts act as lubricants and viscosity reducing agents for thermoplastic polyester resins. These materials assist in making smooth extruded and molded products particularly useful in injection molding operations. Compounds useful in the present invention are those melting below the melting point of the polyester resin with which they are compounded. For example, lithium stearate has a melting point of 210° C. and is suitable for use in poly(tetramethylene terephthalate) (PTMT) which has a melting point of 225° C.

An additional benefit of the metallic acid salts is their ability to function as a nucleating agent, and promote rapid crystallization of the polyester resins.

The compositions containing the lubricating viscosity reducing agents form valuable reinforced products when compounded with reinforcing materials such as glass fibers. The reinforcing materials can range in size up to 0.050 inch average length although preferred lengths average from 0.014 to 0.025 inch. They can be sized if desired although such materials containing no sizing make very useful products.

An example showing the benefit of lubricating agents on melt viscosity is shown in the examples below. Example 1 shows the preparation of a PTMT resin; Example 2 shows determination of melt viscosity on a glass fiber-reinforced PTMT resin; Example 3 shows the effect of a lubricating agent on melt viscosity.

EXAMPLE 1

Poly(tetramethylene terephthalate), hereinafter referred to as PTMT, was produced in a stirred tank reactor by reacting one mole of dimethyl terephthalate (DMT) with 1.2 moles of tetramethylene glycol in the presence of titanium catalyst at a concentration of 0.06 part per thousand at 190° C. and atmospheric pressure until 85 percent of the theoretical amount of methanol had evolved. The oligomers were polymerized under reduced pressure at 250° C. until the desired intrinsic viscosity was reached. The PTMT formed had an intrinsic viscosity (IV) of 0.80 measured in 60/40 phenol/tetrachloroethane solution at 25° C. The PTMT was then ground to granule form.

EXAMPLE 2

The PTMT produced as described in Example 1 had a melt viscosity of 1500 poise as measured by an Instron Rheometer at 250° C. and a shear rate of 750 sec.$^{-1}$. Addition of 30 percent glass fibers to the 0.80 IV PTMT based on the weight of the polyester produced a melt viscosity of 2300 poise as measured by the Instron Rheometer under the same conditions.

EXAMPLE 3

The PTMT produced as described in Example 1 was compounded with 0.5 percent by weight of lithium stearate based on the weight of the polyester. The melt viscosity measured as described in Example 2 was 1200 poise or a 20 percent reduction. Addition of 30 percent glass fibers to the PTMT described in Example 1 followed by 0.5 percent lithium stearate based on the weight of the polyester produced a melt viscosity of 2000 poise or an 11 percent reduction when measured as described in Example 2.

The compositions containing the lubricating viscosity reducing agents of the invention can be formed into foamed products by mixing under pressure with an inert gas such as nitrogen or by compounding the composition with a material which decomposes and releases a gas at a temperature below the molding temperature of the resin. Such compositions can also be compounded with reinforcing materials if desired to produce a foamed reinforced product. These embodiments of the invention are more concretely described with reference to the examples below, where all parts and percentages are by weight unless otherwise specified. Examples 4 through 6 are comparative examples showing the effect imparted by the addition of each ingredient of the foamable polyester resin. Examples 7 and 8 show the effect of molding technique on the foamed resin. Example 9 shows the effect of various densities on the physical properties of the resin.

EXAMPLE 4

To the PTMT formed as described in Example 1 was added 0.5 percent by weight of 5-phenyltetrazole as foaming agent. The foaming agent was dry blended with the PTMT and then charged into the hopper of a one inch single screw extruder for melt compounding. The extruder's temperature zones were set at 450° F. for the feed zone and 460° F. for the extruder barrel and die. The extrudate was not free flowing, was dough-like, and could not form a strand for pelletizing.

EXAMPLE 5

The composition of Example 4 was melt compounded with 0.5 percent by weight of lithium stearate based on the weight of the PTMT. The melt compounding conditions were the same as described in Example 2. The melt flow was significantly improved and the extrudate could be stranded up and pelletized.

This example, when compared to Example 4, illustrates the lubricating effect of the lithium stearate on the PTMT containing a foaming agent.

EXAMPLE 6

The product produced as described in Example 5 was foamed using an injection molding machine equipped with a shut off nozzle. Extruder temperatures were set at 480° F. The nozzle temperature was 490° F. and the mold temperature was 130° F. A multicavity mold forming a cluster of test sample bars and disks was used. The material was foamed to lower densities than the original resin (0.90 grams per cubic centimeter compared to 1.30 grams per cubic centimeter for the original). The surface of the foamed parts was rough with a number of large pores. A solid skin was not formed and the parts did not qualify as structural foam based on a microscopic examination.

EXAMPLE 7

The product produced as described in Example 5 was dry blended with 30 percent glass fibers based on the combined weight of the PTMT and the glass fibers and injection molded into test bars as described in Example 6. The resin was foamed to a density of 0.96 grams per cubic centimeter compared to 1.53 grams per cubic centimeter for the unfoamed composition. The foamed parts had a smooth surface and a solid skin about 1/16 inch in thickness with an average pore size of 80 microns when examined using a microscope.

EXAMPLE 8

Seventy parts by weight of the product produced as described in Example 1 was dry blended with 30 parts by weight of glass fibers, 0.5 parts by weight of 5-phenyltetrazole and 0.2 part by weight of lithium stearate based on the weight of the PTMT. The blend was melt compounded in a one inch extruder having temperature settings of 460° F. in the feed zone and barrel zone and 470° F. in the die zone. The compounded mixture was extruded through a ⅛ inch die and the stranded extrudate was pelletized. The pellets were injection molded as described in Example 6 into plates having the dimensions ¼ inch by 6 inches by 6 inches and having densities ranging from 0.70 gram per cubic centimeter to 1.0 gram per cubic centimeter. The foamed parts formed had a smooth surface, uniform pore size and a solid skin and qualified as structural foam as determined by a microscopic examination.

EXAMPLE 9

The resin having a built-in blowing agent described in Example 8 was molded as described in Example 6 into test bars having densities ranging from 0.7 gram per cubic centimeter to 1.00 gram per cubic centimeter and unfoamed bars having a density of 1.53 grams per cubic centimeter. Densities were varied by adjusting the amount of foamable material injected into the molding cavity during molding. The mechanical properties were tested according to ASTM methods. The data obtained are shown in Table I below.

Table I

| | | | | | (unfoamed) |
|---|---|---|---|---|---|
| Density (g/cc) | 0.7 | 0.8 | 0.9 | 1.0 | 1.53 |
| Tensile Strength, $10^3$ PSI (ASTM-D 638) | 5 | 6.7 | 8 | 9.5 | 18 |
| Flexural Strength, $10^3$ PSI (ASTM-D 790) | 12 | 14.5 | 16 | 18 | 27 |
| Flexural Modulus, $10^5$ PSI (ASTM-D 790) | 5.8 | 7.5 | 8 | 9 | 12 |
| Heat Deflection Temp. ° F. (ASTM-D 648 at 264 PSI) | 355 | 365 | 375 | 385 | 405 |

Thermoplastic polyester resins useful in the practice of this invention are poly(tetramethylene terephthalate) (PTMT), blends of poly(tetramethylene terephthalate) and poly(tetramethylene terephthalate/isophthalate) copolyesters, blends of poly(tetramethylene terephthalate) and poly(tetramethylene terephthalate/isophthalate/sebacate)copolyesters, poly(ethylene terephthalate), blends of poly(ethylene terephthalate) and poly(tetramethylene terephthalate/isophthalate) copolyesters and blends of poly(ethylene terephthalate) and poly(tetramethylene terephthalate) isophthalate/sebacate) copolyesters. Such blends are useful when the homopolyester or homopolyester/copolyester blend has a melting point above about 300° F.

The term "thermoplastic resin" as employed in this disclosure is understood to include base thermoplastic resin as well as those thermoplastic resins compounded with lubricating and nucleating agents or other additives. The thermoplastic resins are crystalline in form. The crystalline thermoplastic resins employed in this invention have a melting point at or above 300° F. The melting point is the maximum useful service temperature of a crystalline solid and is the temperature at which a highly ordered crystalline solid is transformed into a liquid.

The term "polyester" as employed in this disclosure is intended to include both homopolyester and copolyester.

The term "melt viscosity" as employed in this disclosure is intended to mean the viscosity of the polymer melt which determines its processing conditions and limitations and represents the flow characteristics of the polymer.

Foaming agents useful in the practice of this invention are materials that decompose and release a gas not detrimental to the polyester composition when heated to injection molding temperatures. Hydrocarbyltetrazoles are the foaming agents of choice because of their high decomposition temperature, but other foaming agents having a decomposition temperature high enough to survive initial compounding before evolving a gas not detrimental to polyester resins can be used.

The hydrocarbyltetrazoles used as blowing agents are well known in the prior art and are described in detail in U.S. Pat. No. 3,442,829.

The foaming agents are normally used in concentrations of 0.01 to 20 parts by weight based on polyester resin. Preferred concentrations are from 0.5 to 15 parts by weight based on polyester resin. Most preferred concentrations are from 0.1 to 10 parts by weight based on polyester resin.

Representative examples of foaming agents useful in the present invention are p-phenylene-bis(5-tetrazole), 5-methyltetrazole, 5-phenyltetrazole, 5-(benzyl)-tetrazole and 5-(p-toluyl)-tetrazole.

Processing and mixing the ingredients of the foamable, thermoplastic polyester resin without causing decomposition of the foaming agent requires the use of a lubricating agent such as a metallic stearate salt to make processing easier by lowering the temperatures which normally accompany such processing. The resin is preferably produced in cylindrical pellets, chips, or a cubical form. The chips, pellets or cubes can then be easily and cleanly handled for the purposes of foaming and molding the resin. To prevent decomposition of the foaming agent during the making of these pellets, chips and cubes, it is necessary to lower the melt processing temperatures normally found in conventional internal mixing equipment. Such equipment includes extruders and Banbury mixers.

Lubricating agents are normally used in a concentration of from 0.01 to 20 parts by weight of the polyester resin. Preferred concentrations are from 0.05 to 15 parts by weight of the polyester resin. Most preferred concentrations are from 0.1 to 10 parts by weight based on polyester resins. Metallic stearate salts are preferred since they act both as lubricating agents and nucleating agents. Other lubricating agents which lower the melt viscosity of polyester resins below the significant decomposition temperature of the foaming agent used will also be effective.

Representative examples of lubricating agents and nucleating agents useful in the present invention are lithium stearate, sodium stearate, potassium stearate, calcium stearate, zinc stearate, pentaerythritol tetrastearate, methyl palmitate, dimethyl sebacate, aluminum benbenate, n-butyl laurate, isobutyl stearate and methyl benbenate.

Reinforcing agents serve the double purpose of increasing the strength of the foamed polyester while at the same time forming a smooth surface or "skin" on the foamed part. The finished part thus has a fine, smooth appearance with an integral skin and a low density cellular interior.

Reinforcing agents are normally used in a concentration of from 2 to 45 parts by weight based on the combined weight of reinforcing agent and resin. Preferred concentrations are from 10 to 40 parts by weight. The most preferred concentration is from 15 to 35 parts by weight. Acceptable reinforcing agents are those that give a smooth skin to the foamed polyester resin.

Representative examples of reinforcing agents useful in the practice of the present invention are glass fiber, graphite fiber, aramid fiber, asbestos fiber and potassium titanate fibers.

The compositions of this invention can be foamed to densities of from about 0.30 grams per cubic centimeter to near the density of unfoamed reinforced polyester, that is, about 1.53 grams per cubic centimeter. Preferred densities range from about 0.70 grams per cubic centimeter to 1.52 grams per cubic centimeter. Density depends on concentration of ingredients and on the amount of the composition injected into the mold cavity.

While certain representative embodiments and details have been shown for the purpose of illustrating the invention, it will be apparent to those skilled in this art that various changes and modifications may be made therein without departing from the spirit or scope of the invention.

I claim:

1. Foamable thermoplastic polyester moldable compositions having reduced melt viscosity compared with the original polyester resin comprising
   (a) thermoplastic polyester resin homopolyesters selected from the group consisting of poly(ethylene terephthalate) and poly(tetramethylene terephthalate), copolyesters and physical blends of homopolyesters and copolyesters of ethylene terephthalate and of tetramethylene terephthalate having crystalline melting points above about 300° F.,
   (b) 0.05 to 15 parts by weight based on the weight of polyester resin of a melt viscosity reducing agent selected from the group consisting of esters of organic acids containing from 10 to 27 carbon atoms and alkali or alkaline earth metal salts of an organic acid having from 10 to 25 carbon atoms,
   (c) 0.05 to 15 parts by weight based on the weight of the polyester resin of a hydrocarbyltetrazole which can be decomposed to release a gas harmless to the polyester, and
   (d) 2 to 45 parts by weight of a reinforcing agent selected from the group consisting of glass fibers, potassium titanate fibers, aramid fibers, asbestos fibers and graphite fibers based on the combined weight of the polyester resin and the reinforcing agent.

2. A composition as described in claim 1 wherein the metal salt is selected from the group consisting of lithium stearate, sodium stearate, potassium stearate, calcium stearate and zinc stearate.

3. A composition as described in claim 1 wherein the foaming agent is a 5-hydrocarbyltetrazole selected from the group consisting of p-phenylene-bis(5-tetrazole), 5-methyltetrazole, 5-phenyltetrazole, 5-(benzyl)-tetrazole and 5-(p-toluyl)-tetrazole.

4. A method of preparing foamable polyester compositions containing a tetrazole foaming agent said polyester being selected from the group consisting of polyethylene terephthalate and polytetramethylene terephthalate, copolyester resins and physical blends of homopolyester and copolyester resins of ethylene terephthalate and of tetramethylene terephthalate having crystalline melting points above about 300° F. comprising lowering the processing temperature of said polyester resin by
   (a) combining the thermoplastic polyester resin with
      (1) 0.05 to 15 parts by weight based on the weight of the polyester of a lubricating agent selected from the group consisting of esters of organic acids having from 10 to 27 carbon atoms and alkali or alkaline earth metal salts of an organic acid having from 10 to 25 carbon atoms and then mixing the combination with
      (2) 0.05 to 15 parts by weight based on the weight of the polyester of a foaming agent comprising 5-hydrocarbyltetrazoles selected from the group consisting of p-phenylene-bis(5-tetrazole), 5-methyltetrazole, 5-phenyltetrazole, 5-(benzyl)-tetrazole and 5-(p-toluyl)-tetrazole, and
      (3) 2 to 45 parts by weight of a reinforcing agent selected from the group consisting of glass fibers, potassium titanate fibers, aramid fibers, asbestos fibers and graphite fibers based on the combined weight of the polyester resin and reinforcing agent,
   (b) said combination taking place at a temperature about equal to or lower than the temperature at which appreciable decomposition of the 5-hydrocarbyltetrazole foaming agent takes place.

5. A method as described in claim 4 wherein the thermoplastic polyester resin is poly(tetramethylene terephthalate).

6. A method as described in claim 5 wherein the foaming agent is 5-phenyltetrazole.

7. A method as described in claim 6 wherein the metallic salt is a metallic stearate salt selected from the group consisting of lithium stearate, sodium stearate, potassium stearate, zinc stearate and calcium stearate.

8. A method as described in claim 7 wherein the reinforcing material is glass fibers.

9. A method as described in claim 8 wherein the glass fiber is in a concentration of 30 percent by weight of the thermoplastic polyester resin and glass fiber combined.

10. A method of preparing foamed polyester compositions said polyester being selected from the group consisting of thermoplastic homopolyester resins polyethylene terephthalate and polytetramethylene terephthalate, copolyester resins and physical blends of homopolyester and copolyester resins of ethylene terephthalate and of tetramethylene terephthalate having crystalline melting points above about 300° F. comprising lowering the processing temperature of said polyester resin by
    (a) combining the thermoplastic polyester resin with
        (1) 0.05 to 15 parts by weight based on the weight of the polyester of a lubricating agent selected from the group consisting of esters of organic acids having from 10 to 27 carbon atoms and alkali or alkaline earth metal salts of an organic acid having from 10 to 25 carbon atoms and then mixing the combination with
        (2) 0.05 to 15 parts by weight based on the weight of the polyester of a foaming agent comprising 5-hydrocarbyltetrazoles selected from the group consisting of p-phenylene-bis(5-tetrazole), 5-methyltetrazole, 5-phenyltetrazole, 5-(benzyl)-tetrazole and 5-(p-toluyl)-tetrazole and
        (3) 2 to 45 parts by weight of a reinforcing agent selected from the group consisting of glass fibers, potassium titanate fibers, aramid fibers, asbestos fibers and graphite fibers based on the combined weight of the polyester resin and reinforcing agent, 11. A method as described in claim 10 wherein the foamed thermoplastic polyester resin has a density of from about 0.7 grams per cubic centimeter to about 1.52 grams per cubic centimeter.

12. A composition as described in claim 10 wherein the foamed polyester composition has a tensile strength as measured by ASTM-D 638 of from 5000 pounds per square inch to 18,000 pounds per square inch.

13. A composition as described in claim 10 wherein the foamed polyester composition has a flexural modulus as determined by ASTM D-790 of from $5.8 \times 10^5$ pounds per square inch to $12.0 \times 10^5$ pounds per square inch.

14. A composition as described in claim 10 wherein the foamed polyester composition has a flexural strength as determined by ASTM D-790 of from 12,000 pounds per square inch to 27,000 pounds per square inch.

15. A composition as described in claim 10 wherein the foamed polyester composition has a heat deflection temperature as measured by ASTM D-648 at 264 pounds per square inch of from about 355° to about 405° F.

* * * * *